(12) United States Patent
Shin et al.

(10) Patent No.: US 10,090,522 B2
(45) Date of Patent: Oct. 2, 2018

(54) PRECURSOR OF TRANSITION METAL OXIDE, PREPARATION METHOD THEREOF, LITHIUM COMPOSITE TRANSITION METAL OXIDE, AND POSITIVE ELECTRODE AND SECONDARY BATTERY INCLUDING THE SAME

(71) Applicant: LG Chem, Ltd., Seoul (KR)

(72) Inventors: Ho-Suk Shin, Daejeon (KR); Byung-Chun Park, Daejeon (KR); Sang-Min Park, Daejeon (KR); Joo-Hong Jin, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/516,803

(22) PCT Filed: Nov. 2, 2015

(86) PCT No.: PCT/KR2015/011661
§ 371 (c)(1),
(2) Date: Apr. 4, 2017

(87) PCT Pub. No.: WO2016/068681
PCT Pub. Date: May 6, 2016

(65) Prior Publication Data
US 2017/0301916 A1 Oct. 19, 2017

(30) Foreign Application Priority Data

Oct. 31, 2014 (KR) .................. 10-2014-0149881
Oct. 31, 2014 (KR) .................. 10-2014-0149887

(51) Int. Cl.
*H01M 4/505* (2010.01)
*C01B 25/45* (2006.01)
(Continued)

(52) U.S. Cl.
CPC ............. *H01M 4/505* (2013.01); *C01B 25/45* (2013.01); *C01G 53/50* (2013.01); *H01M 4/525* (2013.01);
(Continued)

(58) Field of Classification Search
None
See application file for complete search history.

(56) References Cited

U.S. PATENT DOCUMENTS

| 8,394,299 B2 | 3/2013 | Shin et al. |
| 2013/0202966 A1 | 8/2013 | Yu et al. |
| 2014/0346393 A1 | 11/2014 | Park et al. |

FOREIGN PATENT DOCUMENTS

| KR | 20060130964 A | 12/2006 |
| KR | 20070049810 A | 5/2007 |

(Continued)

OTHER PUBLICATIONS

International Search Report from PCT/KR2015/011661, dated Mar. 7, 2016.

*Primary Examiner* — Olatunji A Godo
(74) *Attorney, Agent, or Firm* — Lerner, David, Littenberg, Krumholz & Mentlik, LLP

(57) ABSTRACT

Provided herein is a precursor of a transition metal oxide, including a core unit and a shell unit, wherein the core unit includes a compound of chemical formula 1 below, and the shell unit includes a compound of chemical formula 2 below.

$$Ni_aMn_bCo_{1-(a+b+c)}M_c[OH_{(1-x)2-y}]A_{(y/n)}$$ [Chemical formula 1]

$$Ni_aMn_bCo_{1-(a'+b'+c')}M'_{c'}[OH_{(1-x')2-y'}]A'_{(y'/n)}$$ [Chemical formula 2]

12 Claims, 3 Drawing Sheets

(51) Int. Cl.
*C01G 53/00* (2006.01)
*H01M 4/525* (2010.01)
*H01M 10/0525* (2010.01)

(52) U.S. Cl.
CPC ..... *H01M 10/0525* (2013.01); *C01P 2004/84* (2013.01); *C01P 2006/40* (2013.01)

(56) References Cited

FOREIGN PATENT DOCUMENTS

| | | | |
|---|---|---|---|
| KR | 20090105868 | A | 10/2009 |
| KR | 20110073630 | A | 6/2011 |
| KR | 20110083383 | A | 7/2011 |
| KR | 101446491 | B1 | 10/2014 |

PRECURSOR OF TRANSITION METAL OXIDE, PREPARATION METHOD THEREOF, LITHIUM COMPOSITE TRANSITION METAL OXIDE, AND POSITIVE ELECTRODE AND SECONDARY BATTERY INCLUDING THE SAME

CROSS REFERENCE TO RELATED APPLICATIONS

The present application is a national phase entry under 35 U.S.C. § 371 of International Application No. PCT/KR2015/011661, filed Nov. 2, 2015, published in Korean, which claims priority to and the benefits of Korean Patent Applications Nos. 10-2014-0149881 and 10-2014-0149887 filed with the Korean Intellectual Property Office on Oct. 31, 2014, the entire contents of which are incorporated herein by reference.

TECHNICAL FIELD

The present disclosure relates to a precursor of a transition metal oxide, a preparation method thereof, and a positive electrode and a secondary battery including the same, and more particularly, to a precursor of a transition metal oxide having a core-shell double-layer structure, a preparation method thereof, a lithium composite transition metal oxide, and a positive electrode and a secondary battery including the same.

The present disclosure relates to a precursor of a transition metal oxide, a preparation method thereof, and a positive electrode and a secondary battery including the same, and more particularly, to a precursor of a transition metal oxide having a core-shell double-layer structure, a preparation method thereof, a lithium composite transition metal oxide, and a positive electrode and a secondary battery including the same.

BACKGROUND ART

Recently, interest in energy storing technologies is gradually increasing. As application areas expand to energies for mobile phones, camcorders and notebook PCs, and further, to electric vehicles, efforts for research and development on electrochemical elements are gradually materializing. In this aspect, electrochemical element is the area gathering the most attention, and most of all, developing secondary batteries capable of charging and discharging is becoming the focus of attention, and recently, in developing such batteries, research and development to design new electrodes and batteries in order to improve capacity density and specific energy is under way.

As a positive electrode active material of a lithium secondary battery, lithium-containing cobalt oxide ($LiCoO_2$) is mostly used, and besides that, lithium-containing manganese oxides such $LiMnO_2$ of crystalline structures on layers and $LiMn_2O_4$ of a spinel crystalline structure and the like, and lithium-containing nickel oxide ($LiNiO_2$) are also being considered for usage.

Of the positive electrode active materials, $LiCoO_2$ has excellent overall properties such as excellent cycle characteristics and the like, and is thus in wide use, but it is expensive due to limitation of resources of cobalt as a raw material. Lithium manganese oxides such as $LiMnO_2$, $LiMn_2O_4$ and the like have advantages that they use manganese that is abundant in resources and that is environmentally-friendly, and thus such lithium manganese oxides draw much interest as positive electrode active materials that could replace $LiCoO_2$. However, these lithium manganese oxides have disadvantages that they have small capacity and that they have bad cycle characteristics and the like.

Further, lithium nickel oxides such as $LiNiO_2$ and the like are inexpensive compared to the cobalt oxides, while showing high discharge capacity when charged to 4.25V, and thus the reversible capacity of doped $LiNiO_2$ comes close to about 200 mAh/g, that exceeds the capacity of $LiCoO_2$ (about 153 mAh/g). Therefore, despites its slightly low average discharge voltage and volumetric density, a commercialized battery including $LiNiO_2$ positive electrode active material has improved energy density, and thus, in recently days, research on such nickel positive electrode active materials is actively under way in order to develop high capacity batteries.

Therefore, a lot of conventional technologies focus on improving the characteristics of $LiNiO_2$ positive electrode active materials and on preparation processes of $LiNiO_2$, and a lithium transition metal oxide having a form where a portion of nickel is substituted for another transition metal such as Co, Mn and the like was proposed. However, problems such as the high production cost of $LiNiO_2$ positive electrode active material, swelling caused by generation of gas in a battery, low chemical stability, and high pH and the like are not being solved sufficiently.

Thus, some prior art documents applied materials such as LiF, $Li_2SO_4$, $Li_3PO_4$ and the like on surfaces of lithium nickel-manganese-cobalt oxides in attempts to improve the performance of batteries, but in such cases, the aforementioned materials were disposed on only the surfaces of the lithium nickel-manganese-cobalt oxides, causing a problem of not only placing limitations to exerting a desired extent of effects, but also requiring a separate process for applying the aforementioned materials on the surfaces of the lithium nickel-manganese-cobalt oxides.

However, despite such various attempts, a lithium composite transition metal oxide having satisfactory performance has yet to be developed.

DISCLOSURE

Technical Problem

The present disclosure is designed to solve the problems of the related art, and therefore the present disclosure is directed to providing a secondary battery simultaneously offering high capacity and high output, including a precursor of a double-layer structure having different contents of positive ions, and a lithium composite transition metal oxide prepared from such a precursor.

The other objectives and advantages of the present disclosure can be understood with the following description and more clearly with the embodiments of the present disclosure. Also, it will be easily understood that the objects and advantages of the present disclosure may be realized by the means shown in the appended claims and combinations thereof.

Technical Solution

In one aspect of the present disclosure, there is provided a precursor of a transition metal oxide, the precursor including a core unit and a shell unit, wherein the core unit includes a compound of chemical formula 1 below, and the shell unit includes a compound of chemical formula 2 below.

[Chemical formula 1]

(The M is at least one selected from a group consisting of W, B, Al, Zr, Ti, Mg, Cr and Si, $0.55 \leq a \leq 0.9$, $0.05 \leq b \leq 0.5$, $0 \leq c \leq 0.1$, $a+b+c \leq 1$, $0<x<0.5$, $0 \leq y \leq 0.05$, n is an oxidation number of A, and A is at least one selected from a group consisting of $PO_4$, $CO_3$, $BO_3$, and F.)

[Chemical formula 2]

(The M' is at least one selected from a group consisting of W, B, Al, Zr, Ti, Mg, Cr and Si, $0.2 \leq a' \leq 0.55$, $0.05 \leq b' \leq 0.5$, $0 \leq c' \leq 0.1$, $a'+b'+c' \leq 0.95$, $0<x'<0.5$, $0 \leq y' \leq 0.05$, n is an oxidation number of A', and A' is at least one selected from a group consisting of $PO_4$, $CO_3$, $BO_3$, and F.)

At least one of the A and A' may include $PO_4$ and F.

A weight ratio of the core unit and the shell unit may be 1:0.2 to 1:2.

A tap density of the precursor of the transition metal oxide may be 1.0 g/cc to 2.5 g/cc.

In another aspect of the present disclosure, there is also provided a preparation method for a precursor of a transition metal oxide, the method including: forming a core unit expressed in chemical formula 1 below by mixing and stirring a first transition metal salt and an alkaline compound; forming a shell unit expressed in chemical formula 2 below on a surface of the core unit by adding and stirring a second transition metal salt and the alkaline compound in the core unit; and post-processing a result of the shell unit formed on the surface of the core unit by filtering and washing and then drying the same.

[Chemical formula 1]

(The M is at least one selected from a group consisting of W, B, Al, Zr, Ti, Mg, Cr and Si, $0.55 \leq a \leq 0.9$, $0.05 \leq b \leq 0.5$, $0 \leq c \leq 0.1$, $a+b+c \leq 1$, $0<x<0.5$, $0 \leq y \leq 0.05$, n is an oxidation number of A, and A is at least one selected from a group consisting of $PO_4$, $CO_3$, $BO_3$, and F.)

[Chemical formula 2]

(The M' is at least one selected from a group consisting of W, B, Al, Zr, Ti, Mg, Cr and Si, $0.2 \leq a' \leq 0.55$, $0.05 \leq b' \leq 0.5$, $0 \leq c' \leq 0.1$, $a'+b'+c' \leq 0.95$, $0<x'<0.5$, $0 \leq y' \leq 0.05$, n is an oxidation number of A', and A' is at least one selected from a group consisting of $PO_4$, $CO_3$, $BO_3$, and F.)

At least one of the first transition metal salt and the second transition metal salt may be sulphate or nitrate.

Further, in yet another aspect of the present disclosure, there is also provided a lithium composite transition metal oxide including a lithium composite transition metal oxide including the precursor of the transition metal oxide mentioned above and a plasticized result of the lithium compound.

The lithium compound may be at least one of lithium hydroxide, lithium carbonate and lithium oxide.

The lithium compound may be 0.95 to 1.2 mol to 1 mol of the precursor of the transition metal oxide.

The plasticizing may be performed at a temperature of 600° C. to 1000° C.

In yet another aspect of the present disclosure, there is also provided a positive electrode including the lithium composite transition metal oxide mentioned above.

Further, in yet another aspect of the present disclosure, there is also provided a secondary battery including a positive electrode mentioned above.

Advantageous Effect

The present disclosure gives the following effects.

The present disclosure provides a precursor of a transition metal oxide including a core unit having a high content of nickel and a shell unit having a high content of cobalt, thereby having an advantage of securing excellent capacity and improving output at the same time.

The present disclosure adds a positive ion including zirconium to a precursor for multicomponent positive electrode active material use including a transition metal of nickel-manganese-cobalt, thus providing an advantage of securing structural stability.

Further, the present disclosure includes a multicomponent composite transition metal positive ion having an optimized mole ratio, thereby providing an effect of reducing resistance and improving output.

Further, the present disclosure uses an additional hydroxyl ion and a certain negative ion, thereby providing an advantage of enabling a positive electrode active material having high density to be prepared, and ultimately providing a secondary battery of high capacity and excellent life characteristics.

DESCRIPTION OF DRAWINGS

Other objects and aspects of the present disclosure will become apparent from the following descriptions of the embodiments with reference to the accompanying drawings in which: The accompanying drawings illustrate preferred embodiments of the present disclosure and, together with the foregoing disclosure, serve to provide further understanding of the technical spirit of the present disclosure. However, the present disclosure should not be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments disclosed in the present specification and the configurations illustrated in the drawings are merely the most preferred embodiments of the present disclosure, and not all of them represent the technical ideas of the present disclosure, and thus it should be understood that there may be various equivalents and modified examples that could substitute therefore at the time of filing the present application.

Figure 1:
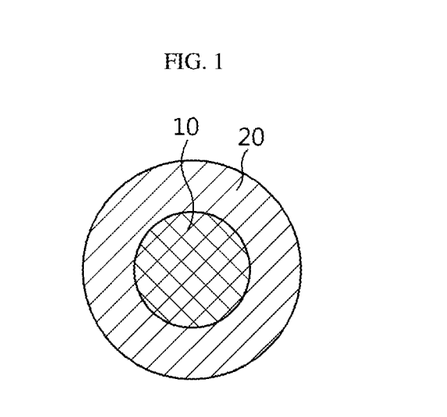
FIG. 1 is a mimetic diagram illustrating a core-shell structure of a transition metal oxide precursor according to an embodiment of the present disclosure.

FIG. 1 is a mimetic diagram illustrating a core-shell structure of a transition metal oxide precursor according to an embodiment of the present disclosure. Referring to FIG. 1, the transition metal oxide precursor according to an embodiment of the present disclosure consists of a double-layer structure including a core unit 10 and a shell unit 20.

Hereinbelow, the composite transition metal forming the core unit and the shell unit of the transition metal oxide precursor will be explained respectively, and a negative ion ($[OH_{(1-x)2-y}]A_{(y/n)}$) will be explained in common.

The core unit includes a compound of chemical formula 1 below.

$$Ni_aMn_bCo_{1-(a+b+c)}M_c[OH_{(1-x)2-y}]A_{(y/n)} \quad \text{[Chemical formula 1]}$$

Here, the M may be at least one selected from a group consisting of W(tungsten), B(boron), Al(aluminum), Zr(zirconium), Ti(titan), Mg(magnesium), Cr(chrome) and Si(silicon).

Further, in the above formula, $0.55 \leq a \leq 0.9$, $0.05 \leq b \leq 0.5$, $0 \leq c \leq 0.1$, $a+b+c \leq 1$, $0 < x < 0.5$, $0 \leq y \leq 0.05$, n is an oxidation number of A, and A is at least one selected from a group consisting of $PO_4$, $CO_3$, $BO_3$, and F.

The core unit includes nickel of high content, the content (a) of nickel being 0.55 to 0.9 as defined above, preferably 0.7 to 0.9. Here, if the content (a) of nickel is less than the numerical range (0.55), the capacity of the transition metal oxide precursor will decrease, causing a problem that it cannot be applied to an electrochemical element that needs high capacity, but if the content (a) of nickel exceeds the numerical range (0.9), on the contrary, there is a problem that stability will significantly be degraded.

Further, as defined above, the content (b) of the manganese is 0.05 to 0.5, and preferably, 0.1 to 0.5. If the content (b) of the manganese is less than the numerical range (0.05), there is a problem that power becomes low, but on the contrary, if the content (b) of the manganese exceeds the numerical range (0.5), there is a problem in exhibiting high capacity.

The content (1−(a+b+c)) of cobalt varies depending on the content, (a+b+c), of the nickel, manganese and metal M, and there occurs a problem where, if the content of cobalt is too high, the cost of raw materials increases overall due to the high content of cobalt, and reversible capacity somewhat decreases, but if the content of cobalt is too low, there occurs a problem where it is difficult to achieve sufficient rate characteristics and high powder density of battery at the same time.

Further, the content (c) of the substituted metal, M, may be substituted to within a range of 0.1 or less, and preferably, within a range of 0.08 or less.

The shell unit includes a compound represented by chemical formula 2 below.

$$Ni_{a'}Mn_{b'}Co_{1-(a'+b'+c')}M'_{c'}[OH_{(1-x')2-y'}]A'_{(y'/n)} \quad \text{[Chemical formula 2]}$$

Here, the M' may be at least one selected from a group consisting of W(tungsten), B(boron), Al(aluminum), Zr(zirconium), Ti(titan), Mg(magnesium), Cr(chrome) and Si(silicon).

Further, in the above formula, $0.2 \leq a' \leq 0.55$, $0.05 \leq b' \leq 0.5$, $0 \leq c' \leq 0.1$, $a'+b'+c' \leq 0.95$, $0 < x' < 0.5$, $0 \leq y' \leq 0.05$, n is an oxidation number of A', and A' is at least one selected from a group consisting of $PO_4$, $CO_3$, $BO_3$, and F.

The content (a') of the shell unit nickel is 0.2 to 0.55, as defined above, preferably 0.3 to 0.5, and if it exceeds the numerical range (0.55), there occurs a problem of not satisfying the stability required in the shell unit, and if it is less than the numerical range (0.2), there occurs a problem of decreasing average capacity of the precursor.

Further, the content (b') of manganese is 0.05 to 0.5, as defined above, and preferably, 0.1 to 0.5. If the content (b') of manganese is less than the numerical range (0.05), there occurs a problem of decreasing power, and on the contrary, if the content (b') of manganese exceeds the numerical range (0.5), there occurs a problem in exhibiting high capacity.

The shell unit includes cobalt of high content, the content (1−(a'+b'+c')) of cobalt differing depending on the content, (a'+b'+c'), of nickel, manganese and metal M' and the shell unit includes a relatively low content of nickel compared to the core unit, increasing the content of cobalt.

If the content of cobalt is too low, there occurs a problem where it is difficult to achieve sufficient rate characteristics and high powder density of battery at the same time as mentioned above, and a problem of degraded output, but on the contrary, if the content of cobalt is too high, there occurs a problem where increase of nickel content deteriorates capacity, and high cobalt production costs increase overall production costs.

The oxidation number of the transition metal that constitutes the core unit and the shell unit of the precursor of the transition metal oxide according to the present disclosure is greater than +2, and preferably, the oxidation number of the transition metal includes a new composite transition metal oxide precursor having an oxidation number close to +3, which is the oxidation number of the transition metal of the lithium composite transition metal oxide.

In the case of preparing a lithium composite transition metal oxide using such a transition metal oxide precursor, the oxidation or reduction process for changing the oxidation number may be simplified, thus providing excellent process efficiency. Further, the lithium composite transition metal oxide prepared as aforementioned not only offers excellent performance as a positive electrode active material, but since there is significantly less amount of reactant byproducts such as $Li_2CO_3$ or $LiOH \cdot H_2O$, it also solves problems such as gelation of slurry due to the reactant byproducts, degradation of high temperature performance of battery, and high temperature swelling and the like.

Materials such as $M(OH)_2$, MOOH and the like were proposed in prior art as transition metal oxide precursors for preparing a lithium composite transition metal oxide by the coprecipitation method.

Of these materials, $M(OH)_2$ has an oxidation number of the transition metal, M, +2, and thus contains all the problems mentioned above as they are, and MOOH has a transition metal oxidation number, +3, which is the same as the transition metal oxide of the lithium composite transition metal oxide and is thus idealistic. However, composing such MOOH is practically very difficult, which is a problem.

This will be explained in more detail hereinafter.

For example, in the case of using a composite transition metal hydroxide of a $Ni_aMn_bCo_{1-(a+b+c)}M_c(OH)_2$ form as a precursor for preparing a lithium composite transition metal oxide including Co, Ni and Mn, the transition metal in the composite transition metal hydroxide has an oxidation number of +2. When using this to prepare a lithium composite transition metal oxide, since the average oxidation number of the composite transition metal in the lithium composite transition metal oxide ($LiMO_2$) is +3, an oxidation process for changing the oxidation number becomes necessary. However, there is a problem that when preparing the lithium composite transition metal oxide in a mass production process, byproduct gas and the like occurs in a high temperature furnace, making it difficult to control the oxidizing atmosphere. Further, as a reactant byproduct, un-oxidized precursor may have a negative effect on an electrode active material.

On the other hand, it is difficult for a composite transition metal hydroxide including Co, Ni and Mn to be prepared as a composite transition metal hydroxide of a $Ni_aMn_bCo_{1-(a+b+c)}M_cOOH$ form having a transition metal oxidation number, +3, due to the structural characteristics of each transition metal and respective stability in aqueous solutions. Specifically, for each single composition of Co, Ni, Mn and the like, composition is possible in a form of $Ni(OH)_2$, $Co(OH)_2$, $Mn(OH)_2$ (space group: P-3m) having a transition metal oxidation number, +2, and a form of Co(OOH) (space group: R-3m, P63/mmc), Mn(OOH) (space group: PBNM, P121/C1, PNMA, PNNM, B121/D1) having a transition metal oxidation number, +3. However, it is very difficult to compose a single phase of a MOOH form including two or more transition metals of Co, Ni and Mn. This is because, since each of Co, Ni and Mn has a different sedimentary condition and different structure itself, it is difficult for a composite precursor to be composed under the same condition (coprecipitation condition).

Accordingly, in order to solve such a problem, the present disclosure provides $Ni_aMn_bCo_{1-(a+b+c)}M_c(OH_{1-x})_2$, which has a higher transition metal oxidation state than $Ni_aMn_bCo_{1-(a+b+c)}M_c(OH)_2$ having an oxidation state of +2, and although it has an oxidation state of +3, it is a new compound unlike MOOH which is actually very difficult to compose, and especially, it has an advantage that it can be practically prepared in a mass production process, and when a lithium composite transition metal oxide is composed, it offers excellent performance In the present disclosure, the phrase "the composite transition metal compound has an oxidation number approximate to the oxidation number of the transition metal of the lithium composite transition metal oxide" means that the oxidation number of the transition metal of the composite transition metal compound is smaller than or approximate to the oxidation number of the transition metal of the lithium composite transition oxides prepared from the precursor including the compound. Therefore, when the oxidation number of the transition metal of the lithium composite transition metal oxide is +3, the oxidation number of the transition metal of the composite transition metal oxide may be, for example, greater than +2 and smaller than +3.

In a measurement error range, even if the oxidation number of the transition metal of the composite transition metal compound is +3, this means that the composite transition metal compound is a material that has a different crystalline structure from a conventional well-known crystalline structure. For example, the composite transition metal compound of the present disclosure shows a different peak from a well-known crystalline structure in prior art with respect to $Ni_aMn_bCo_{1-(a+b+c)}M_c(OH)_2$ and $Ni_aMn_bCo_{1-(a+b+c)}M_cOOH$, meaning that, in the composite transition metal oxide of the present disclosure, even when x has a value very close to 0.5, or x is 0.5 at least in a measurement error range, it is a new crystalline structure that is not well-known in prior art.

In one preferred example, x may be 0.2 or more but 0.5 or less, and more preferably, 0.3 or more but 0.5 or less.

Some well-known technologies for electrode active materials of lithium secondary batteries of prior art include doping or surface-treating the electrode active material of a lithium secondary battery with a lithium compound including specific negative ions such as $F^-$, $PO_4^{3-}$, $CO_3^{2-}$ and the like, or mixing the electrode active material with the lithium compound. For example, some prior art documents present mixing lithium phosphate of a specific structure in a conventional lithium nickel-based oxide and using the mixture as electrode active material in a secondary battery, while other prior art documents present using a lithium manganese-based oxide coated with lithium phosphate as electrode active material to prevent exudation of manganese ions in electrolyte.

However, these prior art technologies require additional processes of preparing the electrode active material and then surface-treating the electrode active material and the like, and consequently, these additional processes may be a cause for increasing the preparation costs of a lithium secondary battery. Further, since specific negative ions end up existing on only the surface of the electrode active material, there are limitations to exhibiting effects up to a certain level.

Therefore, the precursor of the transition metal oxide according to an embodiment of the present disclosure may include only $OH_{1-x}$, or substitute one or more negative ions for a certain amount and use the same, and in the case of using such a precursor where the negative ion is substituted to use the precursor of the transition metal oxide to prepare a lithium composite transition metal oxide, the negative ion may be uniformly included on the surface of or inside the lithium composite transition metal oxide, and thus a secondary battery that is based on the aforementioned may offer excellent output characteristics and life characteristics, and exhibit high charge/discharge efficiency.

That is, the specific negative ion uniformly included on the surface or inside of the lithium composite transition metal oxide may contribute to improving the ion conductivity between grains, induce the grain or crystal growth to be small, reducing structural changes when oxygen is generated at an activating step and broadening the surface area, thereby improving the overall performance of the battery such as rate characteristics and the like.

In the aforementioned chemical formula 1 and chemical formula 2, there is no limitation to negative ion A as long as it can contribute to improving the ion conductivity between grains.

In one preferred example, the aforementioned A may be at least one selected from a group consisting of $PO_4$, $CO_3$, $BO_3$, and F, and especially in the case of including $PO_4$ and F, the aforementioned A may have a very stable structure while having a high lithium diffusion coefficient, and thus is especially preferable since it may increase the stability of the lithium composite transition metal oxide.

If the content of such negative ions, A, is too high, crystallization of the lithium composite transition metal oxide including the negative ion, A, may be hindered, making it difficult to improve the performance of the active material, and if the content of such negative ions, A, is too small, it may be difficult to offer certain effects, and thus the content of A in the composite transition metal oxide may be preferably in the range of 0.01 to 0.05 mol %, and more preferably, 0.02 or more but 0.03 mol % or less of the total amount (in terms of mole).

For reference, the content of such negative ions, A, may of course be determined in the aforementioned range depending on the oxidation number of the negative ions as defined above.

Since such a precursor of the transition metal oxide includes the negative ions, A, it has a high tap density, and one preferred example may be having a tap density of 1.0 g/cc to 2.5 g/cc. Preferably, the precursor of the transition metal oxide may have a tap density of 1.5 g/cc to 2.5 g/cc.

Further, the weight ratio of the core unit and the shell unit may be 1:0.2 to 1:2, more preferably 1:0.3 to 1:1.

Hereinafter, a preparation method of a precursor of a transition metal oxide according to another embodiment of the present disclosure will be explained.

The precursor of the transition metal oxide may be prepared by the coprecipitation method using a transition metal containing salt and an alkaline compound, and the coprecipitation method is a method for simultaneously precipitating two or more kinds of transition metal elements in an aqueous solution using precipitating reaction to prepare the precursor of the transition metal oxide.

Figure 2:
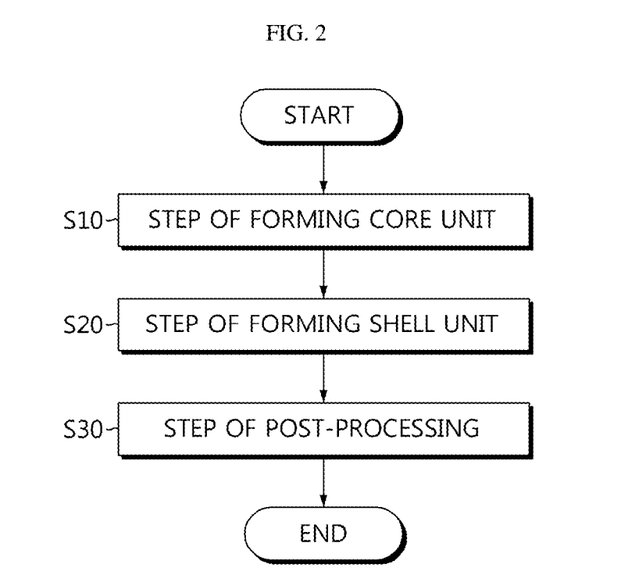
FIG. 2 is a flowchart illustrating a preparation method of a transition metal oxide precursor according to an embodiment of the present disclosure.
Figure 3:
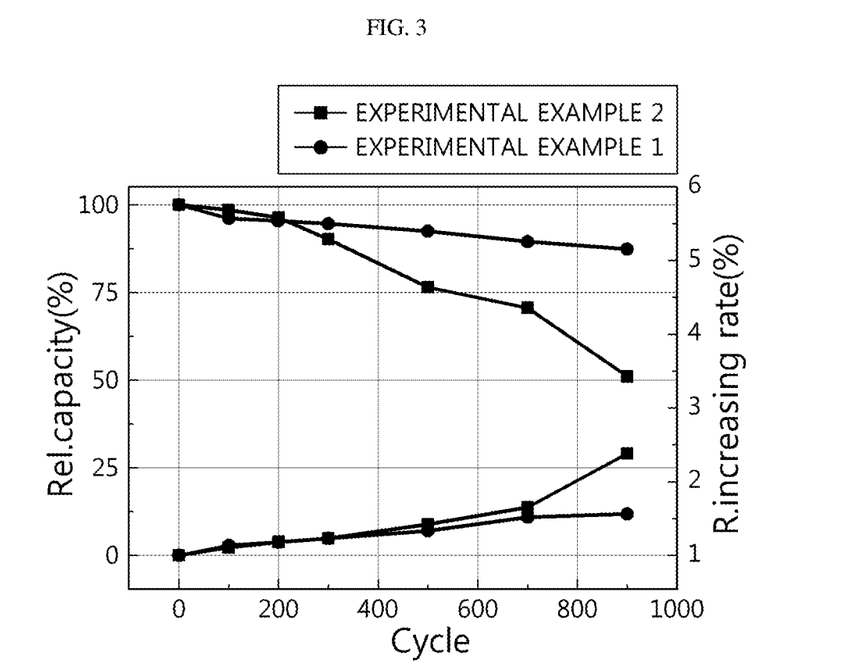
FIG. 3 is a graph illustrating resistance and life characteristics of Experimental Example 1 and Experimental Example 2 of the present disclosure.
Figure 4:
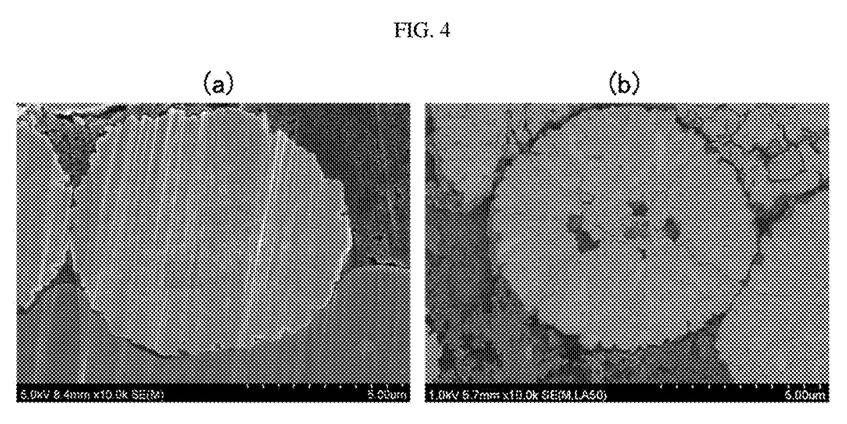
FIG. 4a and FIG. 4b are respectively SEM photos of a transition metal oxide precursor prepared according to Example 1 and Comparative Example 1 of the present disclosure.

FIG. 2 is a flowchart illustrating a preparation method for a precursor of a transition metal oxide according to an embodiment of the present disclosure. Referring to FIG. 2, the preparation method for the precursor of the transition metal oxide of the present disclosure includes a step of forming a core unit (S10), a step of forming a shell unit (S20) and a step of post-processing (S30).

The step of forming a core unit (S10) is a step of forming the core unit expressed in chemical formula 1 below by mixing and stirring a first transition metal salt and an alkaline compound.

[Chemical formula 1]

(The M is at least one selected from a group consisting of W, B, Al, Zr, Ti, Mg, Cr and Si, $0.55 \le a \le 0.9$, $0.05 \le b \le 0.5$, $0 \le c \le 0.1$, $a+b+c \le 1$, $0<x<0.5$, $0 \le y \le 0.05$, n is an oxidation number of A, and A is at least one selected from a group consisting of $PO_4$, $CO_3$, $BO_3$, and F.)

In a specific example, a composite transition metal compound that includes two or more types of transition metals may be prepared by mixing transition metal containing salts in desired mole ratios in consideration of the contents of the transition metals so as to prepare an aqueous solution, and then adding a strong alkali such as sodium hydroxide and the like, and in some cases, adding an additive such as an ammonia supply source and the like, to coprecipitate the same while maintaining the pH to alkaline. Here, by adequately adjusting the temperature, pH, reacting time, concentration of slurry, ion concentration and the like, it is possible to adjust a desired average particle diameter, particle diameter distribution and particle density. The pH range is 9 to 13, preferably 10 to 12, and in some cases, the reaction may be performed in multiple phases.

It is preferable that the first transition metal containing salt is easily decomposed when plasticized, and that it has a negative ion that is easily volatilized, and thus the first transition metal containing salt may be sulphate or nitrate. For example, the first transition metal containing salt may be nickel sulfate, cobalt sulfate, manganese sulfate, nickel nitrate, cobalt nitrate, manganese nitrate or the like, but there is no limitation thereto.

Further, the alkaline compound may be sodium hydroxide, potassium hydroxide, lithium hydroxide or the like, and preferably, sodium hydroxide may be used as the alkaline compound, but there is no limitation thereto.

Further, the compound where the negative ion, A, is included may be expressed in chemical formula, Zx'Ay', and in this formula, Z is one or more selected from a group consisting of Na, $NH_4$, and H, A is one or more selected from a group consisting of $PO_4$, $CO_3$, $BO_3$, and F, the chemical formula satisfies a condition of the oxidation number of Zxx'+the oxidation number of Axy' being 0 in a range of $0<x'<4$ and $0<y'<4$. In a preferred example, the above Zx'Ay' may be one selected from a group consisting of $Na_3PO_4$, $(NH_4)_3PO_4$, $(NH_4)_2HPO_4$, and $(NH_4)_2H_2PO_4$.

Such a compound, Zx'Ay', may be dissolved in water, and preferably, in a state dissolved in the alkaline material defined above in a range of 0.01 mol to 0.05 mol, it may be placed into a reactor, and then reacted with the transition metal salt for preparing the precursor, and preferably, in a state dissolved in a sodium hydroxide solution, it may be placed into the reactor. In some cases, it may be placed into the reactor together with the transition metal containing salt.

In a preferred example, an additive and/or alkalicarbonate capable of forming the transition metal and a complex may be additionally added in the coprecipitation process. The additive used herein may be for example, ammonium ion supply body, ethylene diamine compound, citric acid compound and the like. The ammonium ion supply body may be, for example, ammonia water, ammonium sulfate aqueous solution, ammonium nitrate aqueous solution or the like. The alkalicarbonate may be selected from a group consisting of ammonium carbonate, sodium carbonate, potassium carbonate and lithium carbonate. In some cases, two or more of the aforementioned may be mixed and used.

The amount of the additive and the alkalicarbonate to be added may be adequately determined in consideration of the amount, Ph and the like of the salt containing the transition metal.

Next, the step of forming a shell unit (S20) is a step of preparing a precursor of transition metal oxide of a core-shell double-layered structure by forming the shell unit expressed in chemical formula 2 on a surface of the core unit of the aforementioned chemical formula 1 prepared at the step of forming a core unit (S10) through recoprecipitation.

[Chemical formula 2]

(The M' is at least one selected from a group consisting of W, B, Al, Zr, Ti, Mg, Cr and Si, $0.2 \le a' \le 0.55$, $0.05 \le b' \le 0.5$, $0 \le c' \le 0.1$, $a'+b'+c' \le 0.95$, $0<x'<0.5$, $0 \le y' \le 0.05$, n is an oxidation number of A', and A' is at least one selected from a group consisting of $PO_4$, $CO_3$, $BO_3$, and F.)

That is, a coprecipitation reaction is proceeded in the same method as the step of forming a core unit in order to form the shell unit on the surface of the core unit, and more particularly, a double-layered structure of a core-shell form is formed by simultaneously adding and mixing a second transition metal salt and an alkaline compound in a continuous reactor in the core unit.

Next, the step of post-processing (S30) is a step of filtering and washing a result of forming the shell unit on the surface of the core unit and then drying the same to prepare the precursor of the transition metal oxide, particularly, at this step, the precursor precipitated by the coprecipitation reaction is filtered and washed, and then dried in an oven at a temperature of 60° C. to 150° C.

The precursor prepared as aforementioned has a core-shell double-layered structure, and uniform particle size and grain size, and is controlled on a spherical shaped surface.

According to another embodiment of the present disclosure, there is provided a precursor of the transition metal oxide prepared by the aforementioned preparation method for a precursor of transition metal oxide and a lithium composite transition metal oxide including the plasticizing result of the lithium compound.

Here, there is no limitation to the lithium compound, and thus nonlimiting examples of the lithium compound include lithium hydroxide, lithium carbonate, lithium oxide and the like. Preferably, the lithium compound may be lithium carbonate or lithium hydroxide.

Further, with respect to 1 mol of the precursor of the transition metal oxide, the lithium compound may be 0.95 mol to 1.2 mol, and preferably, 1.0 mol to 1.1 mol. Within the above numerical range, there is an effect of improving the capacity realization rate and life characteristics.

Further, the plasticizing reaction may be performed at a temperature of 600° C. to 1000° C., and preferably 700° C. to 950° C. If the plasticizing temperature is less than 600° C., there occurs a problem where the transition metal oxide precursor is not plasticized completely, and if the plasticizing temperature exceeds 1000° C., there occurs a problem where the properties of the precursor and the lithium compound exposed to high temperature change.

The present disclosure also provides a positive electrode including the lithium composite transition metal oxide as a positive electrode active material and a lithium secondary battery including the same.

The positive electrode is prepared by applying a mixture of the positive electrode active material of the present disclosure, a conductive material and a binder on a positive electrode current collector and drying the same, and when necessary, a filler is further added to the mixture.

The positive electrode is fabricated to a thickness of 3 µm to 500 µm. Such a positive electrode current collector may is not limited to any specific material as long as it has high conductivity and does not cause a chemical change on corresponding battery, and may include, for example, stainless steel, aluminum, nickel, titan, plasticized carbon, or an aluminum or stainless steel surface-treated with carbon, nickel, titan, silver and the like. The current collector may have micro concavo-convex formed on the surface thereof to enhance the adhesion strength of the positive electrode active material, and may have various forms such as film, sheet, foil, net, porous body, foam, nonwoven fabric, and so on.

The conductive material is added from 1 wt % to 20 wt % based on a total weight of the mixture including the positive electrode active material. The conductive material may not be specifically limited to any specific example as long as it does not cause chemical change on corresponding battery and exhibits conductivity, and may include a conductive material such as, for example, graphite such as natural graphite or artificial graphite; carbon black such as carbon black, acetylene black, ketjen black, channel black, furnace black, lamp black, or thermal black; conductive fiber such as carbon fiber or metal fiber; metal powder such as fluorocarbon, aluminum, or nickel powder; conductive whisker such as zinc oxide or potassium titanate; conductive metal oxide such as titanium oxide; and conductive material such as polyphenylene derivatives.

The binder is a component to aid binding of the active material and the conductive material and the binding of the current collector, and is generally added from 1 wt % to 20 wt % based on a total weight of the mixture containing the positive electrode active material. Examples of the binder may be polyvinylidene fluoride, polyvinyl alcohol, carboxymethyl cellulose (CMC), starch, hydroxypropylcellulose, regenerated cellulose, polyvinylpyrrolidone, tetrafluoroethylene, polyethylene, polypropylene, ethylene-propylene-diene ter polymer (EPDM), sulfonated EPDM, styrene-butyrene rubber, fluorine rubber, and various copolymers.

The filler may be optionally used as a component to restrain the expansion of the positive electrode, and there is no particular limitation thereto as long as it is a fiber phase material that does not cause chemical changes in the corresponding battery, and may include, for example, olefin-based polymer such as polyethylene or polypropylene, and fibrous material such as glass fiber or carbon fiber.

The lithium secondary battery generally consists of a positive electrode, a negative electrode, a separator and lithium salt containing non-aqueous electrolyte, and other components of the lithium secondary battery according to the present disclosure will be explained hereinbelow.

The negative electrode is prepared by coating a negative electrode material on a negative current collector and drying the same, and when necessary, the components may further include the components mentioned above.

The negative electrode material may include, for example, carbon such as hard carbon and graphite carbon and the like; metal composite oxide such as $Li_xFe_2O_3(0 \leq x \leq 1)$, $Li_xWO_2$ $(0 \leq x \leq 1)$, $Sn_xMe_{1-x}Me'_yO_z$ and the like (Me: Mn, Fe, Pb, Ge; Me': Al, B, P, Si, elements of family 1, family 2 and family 3 in the periodic table, halogen; $0<x \leq 1$; $1 \leq y \leq 3$; $1 \leq z \leq 8$); lithium metal; lithium alloy; silicon alloy; tin alloy; metal oxide such as SnO, $SnO_2$, PbO, and the like; conductive polymer such as polyacethylene; and Li—Co—Ni-based materials.

The negative electrode current collector is fabricated in a thickness of 3 µm to 500 µm. Such a negative electrode current collector may not be limited to any specific material as long as it has conductivity and does not cause a chemical change on corresponding battery, and may include, for example, copper, stainless steel, aluminum, nickel, titanium, sintered carbon, copper or stainless steel surface-treated with carbon, nickel, titanium, silver, and so on, aluminum-cadmium alloy, and so on. Further, likewise in the positive electrode current collector, the negative electrode active material may have increased binding force by forming micro concavo-convex on the surface thereof, and may have various forms such as film, sheet, foil, net, porous body, foam, nonwoven fabric, and so on.

The separator may be interposed between the positive electrode and the negative electrode, and a thin insulating film having high ion penetration and mechanical strength may be used. A pore diameter of the separator may be generally from 0.01 µm to 10 µm, and a thickness may be generally from 5 µm to 300 µm. The separator may be, for example, olefin-based polymer such as polypropylene, with the chemical resistance and the hydrophobic property; and a sheet or nonwoven fabric made from glass fiber or polyethylene. When the solid electrolyte such as polymer is used for the electrolyte, the solid electrolyte may act also as the separator.

The lithium containing non-aqueous electrolyte is made of non-aqueous electrolyte and lithium salt. The non-aqueous electrolyte used may be non-aqueous electrolyte solution, solid electrolyte, inorganic solid electrolyte and the like.

The non-aqueous electrolyte solution may include, for example, aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxyfranc, 2-methyl tetrahydrofuran, dimethylsulfoxide, 1,3-dioxolane, formamide, dimethylformamide, dioxolane, acetonitrile, nitromethane, form acid methyl, methyl acetate, phosphoric acid triester, trimethoxy methane, dioxolane derivatives, sulforan, methyl sulforan, 1,3-dimethyl-2-imidazolidinone, propylene carbonate derivatives, tetrahydrofuran derivatives, ether, pyropionic methyl, and propionic ethyl.

The organic solid electrolyte may include, for example, polyethylene derivatives, polyethylene oxide derivatives, polypropylene oxide derivatives, phosphoric acid ester polymer, poly agitation lysine, polyester sulfide, polyvinyl alcohol, polyvinylidene fluoride, and a polymer including ionic dissociable group.

The inorganic solid electrolyte may include, for example, nitride, halide, and sulphate of lithium, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$ and the like.

The lithium salt is a material that is readily soluble in the non-aqueous electrolyte described above, and may include for example, $LiCl$, $LiBr$, $LiI$, $LiCl_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, imides and the like.

For the enhancement of the charge/discharge characteristics, flame retardancy, and so on, the nonaqueous electrolyte may be added with, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, aluminum trichloride, and so on. According to embodiments, in order to impart incombustibility, the nonaqueous electrolyte may further contain halogen-containing solvents such as carbon tetrachloride and ethylene trifluoride. Further, in order to improve high-temperature storage characteristic, the nonaqueous electrolyte may further contain carbon dioxide gas, and may further include fluoro-ethylene carbonate (FEC), propene sultone (PRS), fluoro-propylene carbonate (FPC) and the like.

Hereinafter, for more specified description, the present disclosure will be described in detail with reference to Examples. However, the Examples according to the present disclosure can be modified in various forms, and the scope of the present disclosure is not to be construed as being limited to the Examples described below. The Examples according to the present disclosure are provided in order to give more complete description of the present disclosure to those having average knowledge in the art.

EXAMPLE 1

3 L of distilled water was filled in a tank for a 4 L wet reactor use, and then nitrogen gas was sequentially put in the tank at a speed of 1 L/min to remove dissolved oxygen. Here, the temperature of the distilled water in the tank was maintained at 45° C. to 50° C. using a temperature maintaining device. Further, using an impeller connected to a motor installed outside the tank, the distilled water inside the tank was stirred at a speed of 1000 rpm to 1200 rpm.

Nickel sulphate, cobalt sulphate and manganese sulphate were mixed at a ratio (mole ratio) of 80:10:10 to prepare a transition metal aqueous solution of 1.5M concentration, and separately from the transition metal aqueous solution, an aqueous solution of 3M sodium hydroxide where 0.1 mol % of $Na_3PO_4$ was added was prepared. The transition metal aqueous solution was sequentially pumped into the tank for wet reactor use by a controlled volume pump at 0.18 L/hr. The sodium hydroxide aqueous solution was variable-pumped, in an interlocked manner with a control device in order to adjust the pH of the distilled water inside the tank, such that the pH of the distilled water inside tank for wet reactor use is maintained at 11.0 to 11.5. Here, as an additive, ammonia solution of 30% concentration was sequentially pumped together in the reactor at a speed of 0.035 L/hr to 0.04 L/hr.

The flow rates of the transition metal aqueous solution, sodium hydroxide aqueous solution and the ammonia solution were adjusted such that the average staying time of the solution in the tank for wet reactor use is about 5 to 6 hours, and after the reaction inside the tank reached a steady state, duration time was given to form a higher density core unit.

The formed core unit and nickel sulphate, cobalt sulphate, and manganese sulphate were mixed in a ratio (mole ratio) of 50:5:45 to form a shell unit on a surface of the core unit in the same method as the preparation method for the core unit mentioned above, and then washed with distilled water numerous times, and dried for 24 hours in a drier of a constant temperature of 120° C., so as to obtain a nickel-cobalt-manganese composite transition metal precursor.

COMPARATIVE EXAMPLE 1

3 L of distilled water was filled in a tank for a 4 L wet reactor use, and then nitrogen gas was sequentially put into the tank at a speed of 1 L/min to remove dissolved oxygen. Here, the temperature of the distilled water in the tank was maintained at 40° C. to 45° C. using a temperature maintaining device. Further, using an impeller connected to a motor installed outside the tank, the distilled water inside the tank was stirred at a speed of 1000 rpm to 1200 rpm.

Nickel sulphate, cobalt sulphate and manganese sulphate were mixed at a ratio (mole ratio) of 0.55:0.2:0.25 to prepare a transition metal aqueous solution of 2.0M concentration, and separately from the transition metal aqueous solution, an aqueous solution of 4M sodium hydroxide was prepared. The transition metal aqueous solution was sequentially pumped into the tank for wet reactor use by a controlled volume pump at 0.18 L/hr. The sodium hydroxide aqueous solution was variable-pumped, in an interlocked manner with a control device in order to adjust the pH of the distilled water inside the tank, such that the pH of the distilled water inside tank for wet reactor use is maintained at 10.0 to 10.5. Here, as an additive, ammonia solution of 30% concentration was sequentially pumped together in the reactor at a speed of 0.01 L/hr to 0.015 L/hr, so as to form a composite transition metal precursor.

EXPERIMENTAL EXAMPLE 1

The nickel-cobalt-manganese composite transition metal precursors prepared in Example 1 were mixed with $Li_2CO_3$ at a ratio (weight ratio) of 1:1, and then heated at a heating rate of 5° C./min and plasticized for 10 hours at 920° C., so as to prepare positive electrode active material powder of $Li[Ni_{0.55}Co_{0.2}Mn_{0.25}]O_2$ where $PO_4$ negative ions of 0.2 wt % are substituted.

In the positive electrode active material powder prepared as aforementioned, Denka and KF1100 were mixed, as conductive material and binder, respectively, at a weight ratio of 95:2.5:2.5 to prepare a slurry, and the slurry was uniformly coated on an aluminum foil of a thickness of 20 μm. This was dried at 130° C. to prepare a positive electrode for lithium secondary battery.

Using the positive electrode for lithium secondary battery prepared as aforementioned, a lithium metal film as an opposite electrode (negative electrode), a polyethylene film as a separator (Celgard, thickness: 20 μm), and a liquid electrolyte where 1M of $LiPF_6$ is dissolved in a solvent where ethylene carbonate, dimethylene carbonate, diethyl carbonate were mixed in 1:2:1, 2016 coin battery was prepared.

EXPERIMENTAL EXAMPLE 2

The nickel-cobalt-manganese composite transition metal precursors prepared in Comparative Example 1 were mixed with $Li_2CO_3$ at a ratio (weight ratio) of 1:1, and then heated at a heating rate of 5° C./min and plasticized for 10 hours at 920° C., so as to prepare positive electrode active material powder of $Li[Ni_{0.55}Co_{0.2}Mn_{0.25}]O_2$.

In the positive electrode active material powder prepared as aforementioned, Denka and KF1100 were mixed, as conductive material and binder, respectively, at a weight ratio of 95:2.5:2.5 to prepare a slurry, and the slurry was uniformly coated on an aluminum foil of a thickness of 20 μm. This was dried at 130° C. to prepare a positive electrode for lithium secondary battery.

Using a liquid electrolyte where 1M of $LiPF_6$ is dissolved in a solvent where the positive electrode for lithium secondary battery prepared as aforementioned, a lithium metal film as a counter electrode (negative electrode), a polyethylene film as a separator (Celgard, thickness: 20 μm), and ethylene carbonate, dimethylene carbonate, diethyl carbonate were mixed in 1:2:1, 2016 coin battery was prepared.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

DESCRIPTION OF REFERENCE NUMERALS

10: CORE UNIT
20: SHELL UNIT

What is claimed is:

1. A precursor of a transition metal oxide, the precursor comprising a core unit and a shell unit,
    wherein the core unit comprises a compound represented by chemical formula 1 below, and
    the shell unit comprises a compound represented by chemical formula 2 below,

[Chemical formula 1]

wherein M is at least one selected from a group consisting of W, B, Al, Zr, Ti, Mg, Cr and Si, $0.55 \leq a \leq 0.9$, $0.05 \leq b \leq 0.5$, $0 \leq c \leq 0.1$, $a+b+c \leq 1$, $0 < x < 0.5$, $0 \leq y \leq 0.05$, n is an oxidation number of A, and A is at least one selected from a group consisting of $PO_4$, $CO_3$, $BO_3$, and F,

[Chemical formula 2]

wherein M' is at least one selected from a group consisting of W, B, Al, Zr, Ti, Mg, Cr and Si, $0.2 \leq a' \leq 0.55$, $0.05 \leq b' \leq 0.5$, $0 \leq c' \leq 0.1$, $a'+b'+c' \leq 0.95$, $0 < x' < 0.5$, $0 \leq y' \leq 0.05$, n is an oxidation number of A', and A' is at least one selected from a group consisting of $PO_4$, $CO_3$, $BO_3$, and F.

2. The precursor of claim 1, wherein at least one of the A and A' comprises $PO_4$ and F.

3. The precursor of claim 1, wherein a weight ratio of the core unit and the shell unit is 1:0.2 to 1:2.

4. The precursor of claim 1, wherein a tap density of the precursor of the transition metal oxide is 1.0 g/cc to 2.5 g/cc.

5. A preparation method for a precursor of a transition metal oxide, the precursor comprising a core unit and a shell unit, the method comprising:
    mixing a first transition metal salt and an alkaline compound to form a core unit represented by chemical formula 1 below;
    mixing a second transition metal salt and the alkaline compound with the core unit to form a shell unit represented by chemical formula 2 below on a surface of the core unit;
    filtering and washing the precursor comprising the core unit and the shell unit; and
    then drying the same,

[Chemical formula 1]

wherein M is at least one selected from a group consisting of W, B, Al, Zr, Ti, Mg, Cr and Si, $0.55 \leq a \leq 0.9$, $0.05 \leq b \leq 0.5$, $0 \leq c \leq 0.1$, $a+b+c \leq 1$, $0 < x < 0.5$, $0 \leq y \leq 0.05$, n is an oxidation number of A, and A is at least one selected from a group consisting of $PO_4$, $CO_3$, $BO_3$, and F,

[Chemical formula 2]

wherein M' is at least one selected from a group consisting of W, B, Al, Zr, Ti, Mg, Cr and Si, $0.2 \leq a' \leq 0.55$, $0.05 \leq b' \leq 0.5$, $0 \leq c' \leq 0.1$, $a'+b'+c' \leq 0.95$, $0 < x' < 0.5$, $0 \leq y' \leq 0.05$, n is an oxidation number of A', and A' is at least one selected from a group consisting of $PO_4$, $CO_3$, $BO_3$, and F.

6. The method of claim 5, wherein at least one of the first transition metal salt and the second transition metal salt is sulphate or nitrate.

7. A lithium composite transition metal oxide prepared by plasticizing the precursor of claim 1 and a lithium compound.

8. The lithium composite transition metal oxide of claim 7, wherein the lithium compound is at least one of lithium hydroxide, lithium carbonate and lithium oxide.

9. The lithium composite transition metal oxide of claim 7, wherein the lithium compound is 0.95 to 1.2 mol to 1 mol of the precursor of the transition metal oxide.

10. The lithium composite transition metal oxide of claim 7, wherein the plasticizing is performed at a temperature of 600° C. to 1000° C.

11. A positive electrode comprising the lithium composite transition metal oxide of claim 7.

12. A secondary battery comprising the positive electrode of claim 11.

* * * * *